US012692756B2

(12) United States Patent
Natarajan et al.

(10) Patent No.: US 12,692,756 B2
(45) Date of Patent: Jul. 28, 2026

(54) SYSTEM FOR DETERMINING HEALTH OF DRILL STRING COMPONENTS OF DRILLING MACHINES

(71) Applicant: Caterpillar Global Mining Equipment LLC, Denison, TX (US)

(72) Inventors: Yagneshwar Natarajan, Chennai (IN); Charles Taylor Hudson, Sherman, TX (US); Roberto Garcia, Sherman, TX (US); Rex Glover, Deer Creek, IL (US)

(73) Assignee: Caterpillar Global Mining Equipment LLC, Denison, TX (US)

( * ) Notice: Subject to any disclaimer, the term of this patent is extended or adjusted under 35 U.S.C. 154(b) by 0 days.

(21) Appl. No.: 18/953,233

(22) Filed: Nov. 20, 2024

(65) Prior Publication Data

US 2026/0139557 A1 May 21, 2026

(51) Int. Cl.

*E21B 19/16* (2006.01)
*E21B 12/02* (2006.01)
*G08B 21/18* (2006.01)

(52) U.S. Cl.

CPC ............ *E21B 19/165* (2013.01); *E21B 12/02* (2013.01); *G08B 21/182* (2013.01)

(58) Field of Classification Search

CPC ...... E21B 19/165; E21B 12/02; G08B 21/182
See application file for complete search history.

(56) References Cited

U.S. PATENT DOCUMENTS

| | | | | |
|---|---|---|---|---|
| 6,298,926 | B1 * | 10/2001 | Dalkert | E21B 19/167 175/85 |
| 6,868,920 | B2 | 3/2005 | Hoteit et al. | |
| 7,841,415 | B2 * | 11/2010 | Winter | E21B 19/165 166/85.1 |
| 9,523,269 | B2 | 12/2016 | Hoult et al. | |
| 9,822,628 | B2 | 11/2017 | Pool et al. | |
| 11,852,004 | B2 * | 12/2023 | Haworth | G08B 21/182 |
| 11,993,988 | B2 * | 5/2024 | Magnuson | E21B 19/163 |
| 2004/0159425 | A1 * | 8/2004 | Webre | E21B 19/165 166/250.01 |
| 2019/0032652 | A1 * | 1/2019 | McCarthy | F04B 47/04 |

FOREIGN PATENT DOCUMENTS

| | | |
|---|---|---|
| CN | 108168755 A | 6/2018 |
| KR | 20150100266 A | 9/2015 |

* cited by examiner

*Primary Examiner* — Tara Schimpf
*Assistant Examiner* — Daniel T Craig

(57) ABSTRACT

A system for determining health of a drill string component of a drilling machine is disclosed. The system comprises a controller configured to receive, from a sensing device, a signal indicative of a duty cycle of an actuator corresponding to an engaged position of a deck wrench. The actuator is operably coupled to the deck wrench to facilitate movement of the deck wrench between a disengaged position to allow a rotational movement of the drill string component and the engaged position to restrict the rotational movement of the drill string component. The controller is further configured to determine a wear level of the drill string component based on the duty cycle of the actuator corresponding to the engaged position of the deck wrench.

20 Claims, 7 Drawing Sheets

SYSTEM FOR DETERMINING HEALTH OF DRILL STRING COMPONENTS OF DRILLING MACHINES

TECHNICAL FIELD

The present disclosure relates to a system for determining health of a drill string component of a drilling machine. More particularly, the present disclosure relates to a system for determining health of a drill string component of a drilling machine using an actuator coupled to a deck wrench.

BACKGROUND

Drilling machines are used to drill holes into ground surfaces in applications, such as mining. A drilling machine typically includes a drill string assembly. The drill string assembly may be formed as a combination of one or more drill string components, such as a drill pipe, a drill pipe adapter, and a drill bit, that moves along a mast frame of the drilling machine to drill holes into the ground surface. These drill components wear over time and may result in misalignment between two connecting drill pipes due to excessive wear, especially impacting their coupling in a multi pass drilling operation or an autonomous multi pass drilling operation.

Many times, an excessively worn-out drill-pipe may lead to quality issues in the drilled holes and inefficient blasting. Further, due to the misalignment of the drill pipe, the drilled hole deviates from its predefined axis. This may cause the drill pipe to be lodged, potentially resulting in the loss of the entire drill string, resulting in high unwanted expenses. Therefore, the drill pipe wear must be measured from time to time. Conventionally, an operator is required to physically inspect the wear of the drill pipe.

U.S. Pat. No. 11,852,004 discloses systems, methods, and devices for controlling the operation of an industrial machine (e.g., a drill) based on a determined attribute of a pipe. A sensor is configured to generate an output signal related to a characteristic of the pipe. The characteristic of the pipe can be the presence or absence of a pipe, a weight of the pipe, etc. A controller receives the output signal from the sensor and determines an attribute of the pipe based on the output signal from the sensor. In some embodiments, the attribute of the pipe is a wall thickness of the pipe. In some embodiments, the controller determines the wall thickness of the pipe based on a difference between an initial weight for the pipe and a current or present weight of the pipe. In some embodiments, the controller determines the wall thickness of the pipe based on a difference between an initial diameter of the pipe and a current or present diameter of the pipe. The controller is then configured to control the industrial machine or take a control action based on the attribute of the pipe.

SUMMARY OF THE INVENTION

In an embodiment, the present disclosure relates to a system for determining health of a drill string component of a drilling machine. The system comprises a controller configured to receive, from a sensing device, a signal indicative of a duty cycle of an actuator corresponding to an engaged position of a deck wrench. The actuator is operably coupled to the deck wrench to facilitate movement of the deck wrench between a disengaged position to allow a rotational movement of the drill string component and the engaged position to restrict the rotational movement of the drill string component. The controller is further configured to determine a wear level of the drill string component based on the duty cycle of the actuator corresponding to the engaged position of the deck wrench.

In another embodiment, the present disclosure relates to a drilling machine. The drilling machine includes a mast frame, a drill string component configured to perform an operation of the drilling machine. The drilling machine further includes a deck wrench configured to move between a disengaged position to allow a rotational movement of the drill string component and an engaged position to restrict the rotational movement of the drill string component. The drilling machine further includes an actuator operably coupled to the deck wrench and the mast frame. The actuator is configured to facilitate movement of the deck wrench between the disengaged position and the engaged position. The drilling machine further includes a system for determining health of the drill string component. The system includes a controller configured to receive, from a sensing device, a signal indicative of a duty cycle of the actuator corresponding to the engaged position of the deck wrench. The controller is further configured to determine a wear level of the drill string component based on the duty cycle of the actuator corresponding to the engaged position of the deck wrench.

In another embodiment, the present disclosure relates to a method for determining health of a drill string component of a drilling machine. The method includes receiving, from a sensing device, a signal indicative of a duty cycle of an actuator corresponding to an engaged position of a deck wrench. The actuator is operably coupled to the deck wrench to facilitate movement of the deck wrench between a disengaged position to allow a rotational movement of the drill string component and the engaged position to restrict the rotational movement of the drill string component. The method further includes determining, by a controller, a wear level of the drill string component based on the duty cycle of the actuator corresponding to the engaged position of the deck wrench

DETAILED DESCRIPTION

Reference will now be made in detail to specific embodiments or features, examples of which are illustrated in the accompanying drawings. Wherever possible, the same reference numbers will be used throughout the drawings to refer to the same or the like parts.

Figure 1:
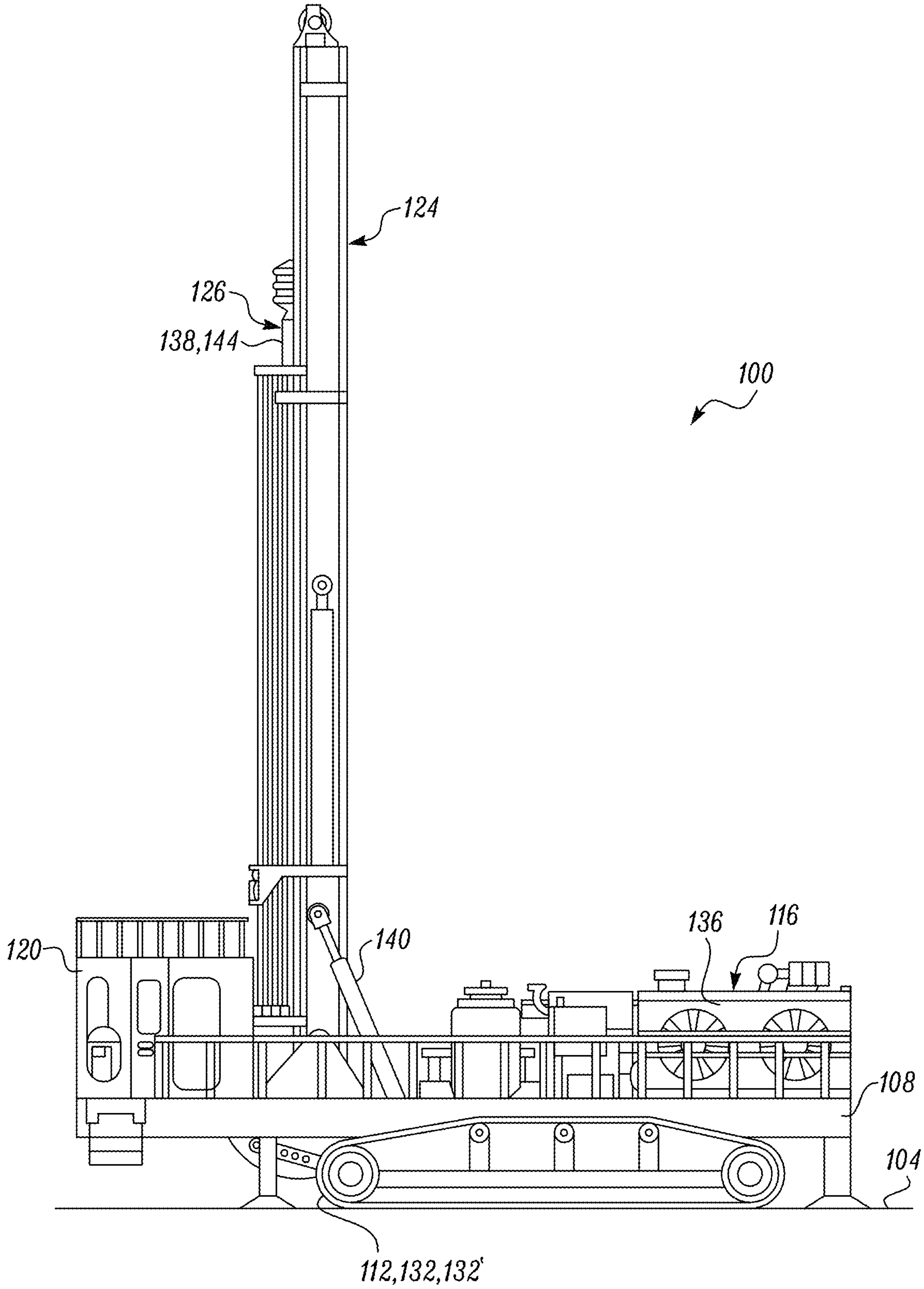
FIG. 1 is a side view of an exemplary drilling machine, according to an embodiment of the present disclosure.

Referring to FIG. 1, an exemplary drilling machine 100 is shown. The drilling machine 100 may be employed to perform one or more operations, namely a drilling operation, in which the drilling machine 100 penetrates the earth to mine for materials, such as ore, soil, debris, or other naturally occurring deposits at a jobsite 104. In some embodiments, the drilling machine 100 may be an autonomous or semiautonomous drilling machine configured to perform multi pass drilling or single pass drilling. The drilling machine 100 may include a chassis 108, ground-engaging traction assemblies 112, a power system 116, and an operator cabin 120. Also, the drilling machine 100 includes a mast frame 124, a drill string 126, a deck wrench 130, and a wrench actuation assembly 134.

The chassis 108 may support the power system 116, the operator cabin 120, and the mast frame 124, although other known components and structures may be supported by the chassis 108, as well. The ground-engaging traction assemblies 112 may support the chassis 108 on the ground at the jobsite 104. The ground-engaging traction assemblies 112 may include a set of crawler tracks 132. The crawler tracks 132 may be configured to move and transport the drilling machine 100 from one location to another at the jobsite 104, according to a customary practice known in the art. In some embodiments, two crawler tracks 132 are provided, one on each side of the drilling machine 100 (only one crawler track 132' is visible in FIG. 1). In some embodiments, the ground-engaging traction assemblies 112 may include wheeled units (not shown) provided either alone or in combination with the crawler tracks 132.

The power system 116 may include a power compartment 136 and a power source (not shown) provided within the power compartment 136. The power source may include a combustion engine, or an electrical power source, or a combination thereof. The power source may be configured to generate an output power required to operate various systems or assemblies on the drilling machine 100.

The operator cabin 120 may be supported over the chassis 108. The operator cabin 120 may facilitate stationing of one or more operators therein, to monitor the operations of the drilling machine 100. Also, the operator cabin 120 may house various components and controls of the drilling machine 100, such as joysticks, display units, etc. (not shown), that may be used for facilitating the machine's movement and operation at the jobsite 104. In some embodiments, the drilling machine 100 may be operated autonomously or semi-autonomously. In such a case, the operator cabin 120 may be located remotely from the drilling machine 100.

The mast frame 124 may be coupled and mounted to the chassis 108. As an example, the mast frame 124 may be pivotably coupled to the chassis 108 to move between a first position and a second position with respect to the chassis 108. For example, the first position of the mast frame 124 may be a position at which the drilling machine 100 may perform drilling and the second position of the mast frame 124 may be a position at which the mast frame 124 may be stowed on the drilling machine 100, and in which position, the drilling machine 100 may tram across the jobsite 104. The configuration of the mast frame 124 in FIG. 1 illustrates the first position of the mast frame 124. In some embodiments, the mast frame 124 may move between the first position and the second position by way of one or more mast position actuator 140 (see FIG. 1). The mast position actuator 140 may be selected from at least one of hydraulically powered mast position actuators, pneumatically powered mast position actuators, and the likes. The mast frame 124 may further include a deck 142 located at a bottom end 146 of the mast frame 124. The deck 142 is configured to support and guide the drill string 126 during drilling operation.

Figure 2:
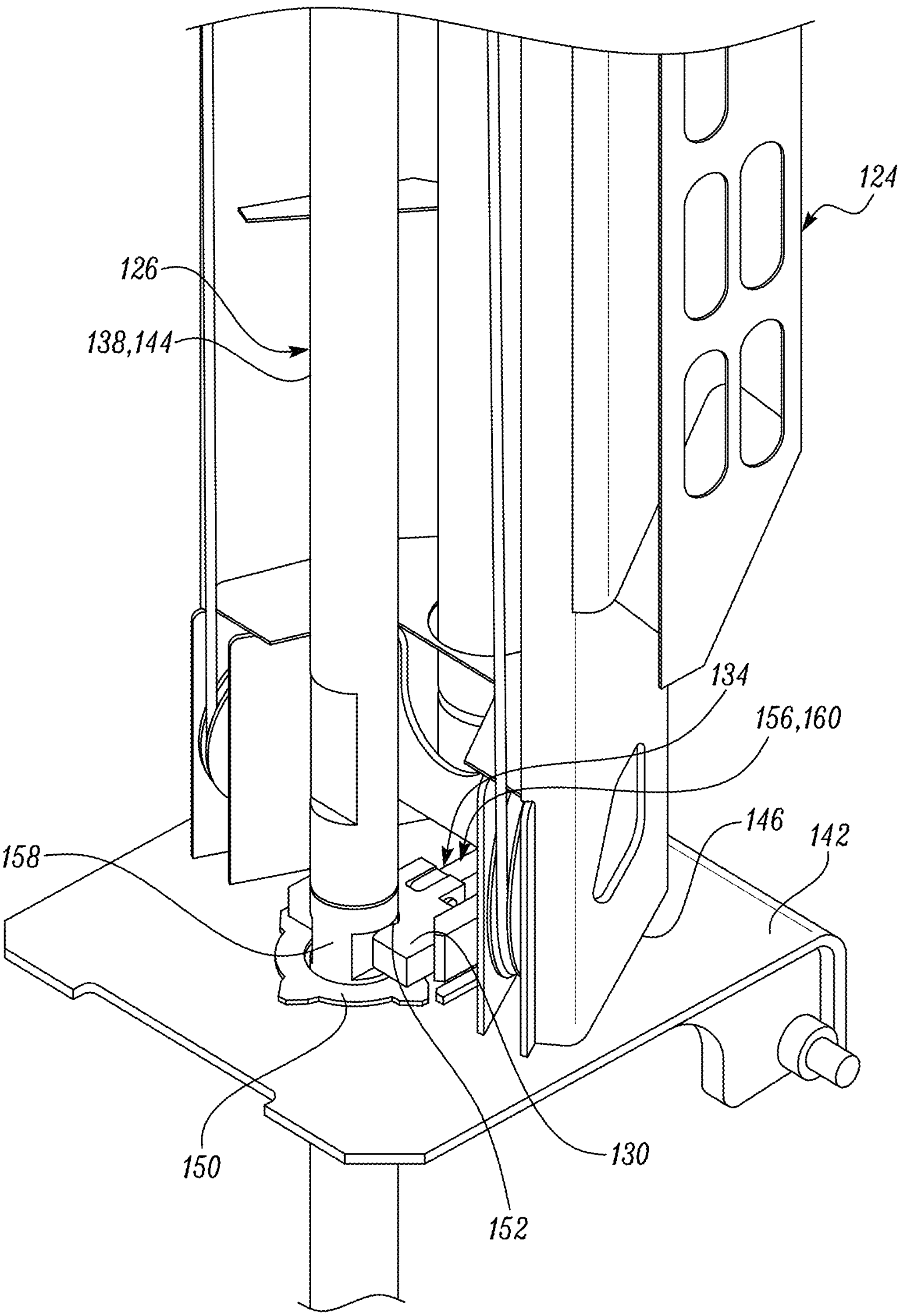
FIG. 2 is a perspective view of a portion of the drilling machine of FIG. 1 depicting a deck, a mast frame, and a drill string component, according to an embodiment of the present disclosure.

Referring now to FIG. 2, the drill string 126 is configured to perform drilling operations of the drilling machine 100. The drill string 126 may include one or more drill string components 138. The drill string components 138 may include one or more drill pipes 144 (e.g., for multi pass drilling), one or more drill pipe adapters 158, and a drill bit (not shown). In an example, the drill string 126 may be configured to drill a hole at the jobsite 104. The drill pipe adapter 158 may be configured to engage two drill pipes 144 (of the multiple drill pipes 144) together to form the drill string 126. The deck 142 may include a deck bushing 150. The deck bushing 150 may be disposed in a deck bore (not shown) defined at the deck 142. The deck bushing 150 may be configured to support and guide the drill pipe 144, for example, during drilling operations, and during engagement or disengagement of the deck wrench 130.

The deck wrench 130 may be located towards a lower portion of the mast frame 124 near the deck 142. The deck wrench 130 may include a wrench jaw 152 (shown in FIG. 3) for engaging the deck wrench 130 with the drill string component 138 (e.g., to the drill pipe 144, or to the drill pipe adapter 158). In an example, as shown in FIG. 2, the wrench jaw 152 may hold the drill pipe adapter 158 stationary so that the drill pipe 144 may be connected to or removed from the drill pipe adapter 158, for example, by rotating the drill pipe 144 (via a rotary head or a hydraulically operated breakout wrench) relative to the drill pipe adapter 158 (or another drill pipe 144). In some embodiments, the deck wrench 130 may hold the drill string 126 (e.g., drill pipe 144 or drill adapter 158) during connection or removal of two drill pipes 144 in multi pass drilling.

The deck wrench 130 may be configured to move between a disengaged position and an engaged position. In the disengaged position, the deck wrench 130 may not hold the drill string component 138 (e.g., the drill pipe adapter 158 or the drill pipe 144), thereby allowing a rotational movement of the drill string component 138 about an axis. In the engaged position, the deck wrench 130 may contact and hold the drill string component 138 (e.g., the drill pipe adapter 158 or the drill pipe 144) to restrict the rotational movement of the drill string component 138 from the drill string 126.

The wrench actuation assembly 134 may include an actuator 156 and a sensing device 176. The actuator 156 may be operably coupled to the deck wrench 130 and the mast frame 124. The actuator 156 is configured to facilitate movement of the deck wrench 130 between the disengaged position and the engaged position. In an exemplary embodiment, as shown in FIGS. 3-6, the actuator 156 includes a fluid actuator 160. The fluid actuator 160 may include a cylinder 164 defining a first end 166' and a second end 166". The cylinder 164 may be coupled to the deck 142 of mast frame 124 at its second end 166" about an axis, X. The fluid actuator 160 may further include a rod portion 168 displaceably positioned relative to the cylinder 164. The rod portion 168 may define a first end 172 couplable to the deck wrench 130, and a second end (not shown) opposite to the first end 172. In an example, the first end 172 of the rod portion 168 may be coupled to the deck wrench 130 by using a coupler or a pin defining an axis, A.

In operation, for example, to perform engagement or disengagement of the drill string component 138 from the drill string 126, the rod portion 168 may reciprocate relative to the cylinder 164 upon influx and efflux of fluid (e.g., oil) into and out of the cylinder 164. Such reciprocating movement of the rod portion 168 relative to the cylinder 164 may cause the deck wrench 130 to correspondingly move between the disengaged position and the engaged position, to perform said engagement and/or disengagement operations.

It may be contemplated that, in some embodiments, the fluid actuator 160 may be a hydraulic actuator, pneumatic actuator, or any other actuator known in the art. Further, it may be noted that, in other embodiments, the actuator 156 may be an electric motor configured to drive the deck wrench 130 between the disengaged position and the engaged position.

Figure 3:
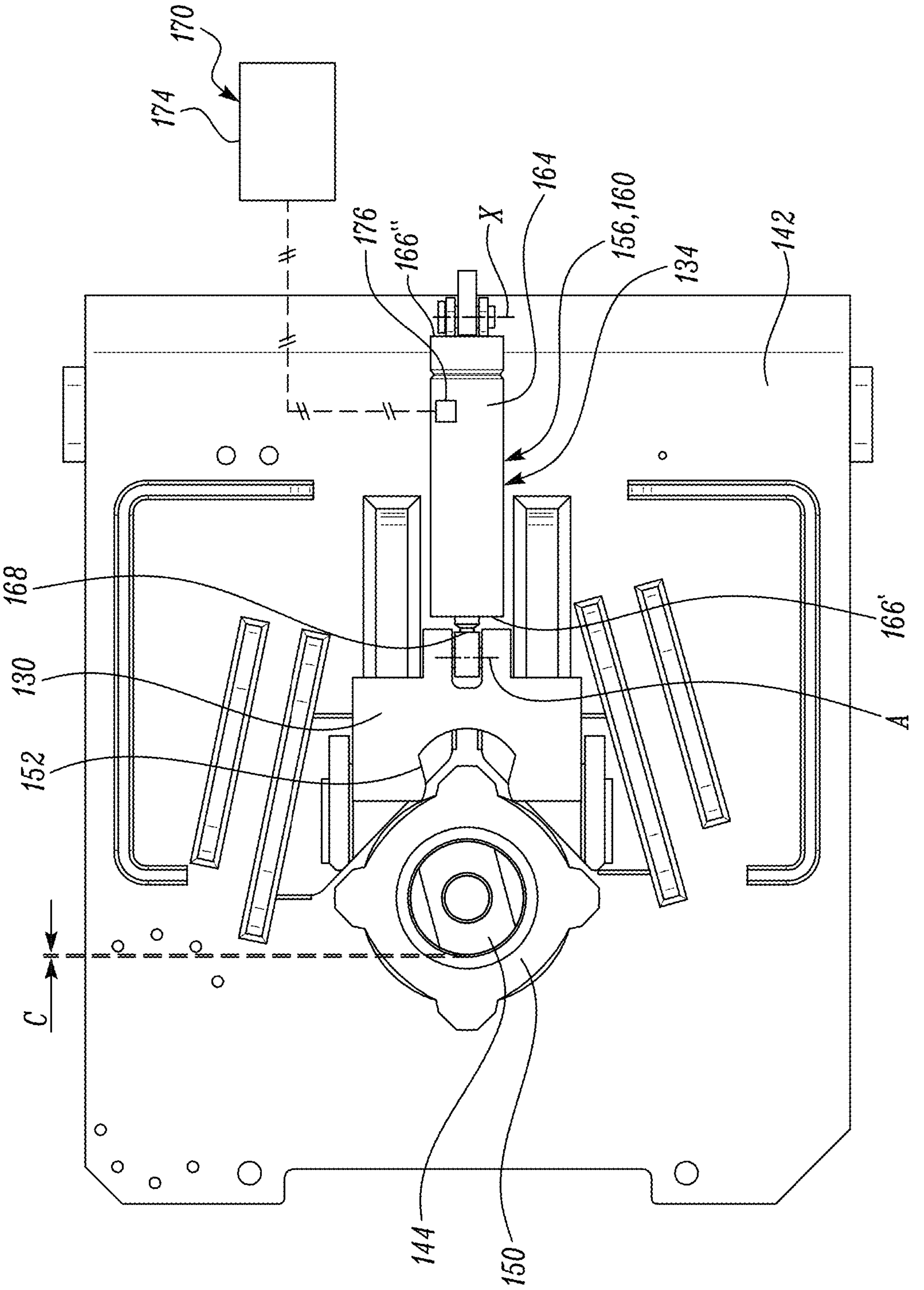
FIG. 3 is a top view of the deck having a new drill pipe with an actuator in a default position, according to an embodiment of the present disclosure.
Figure 4:
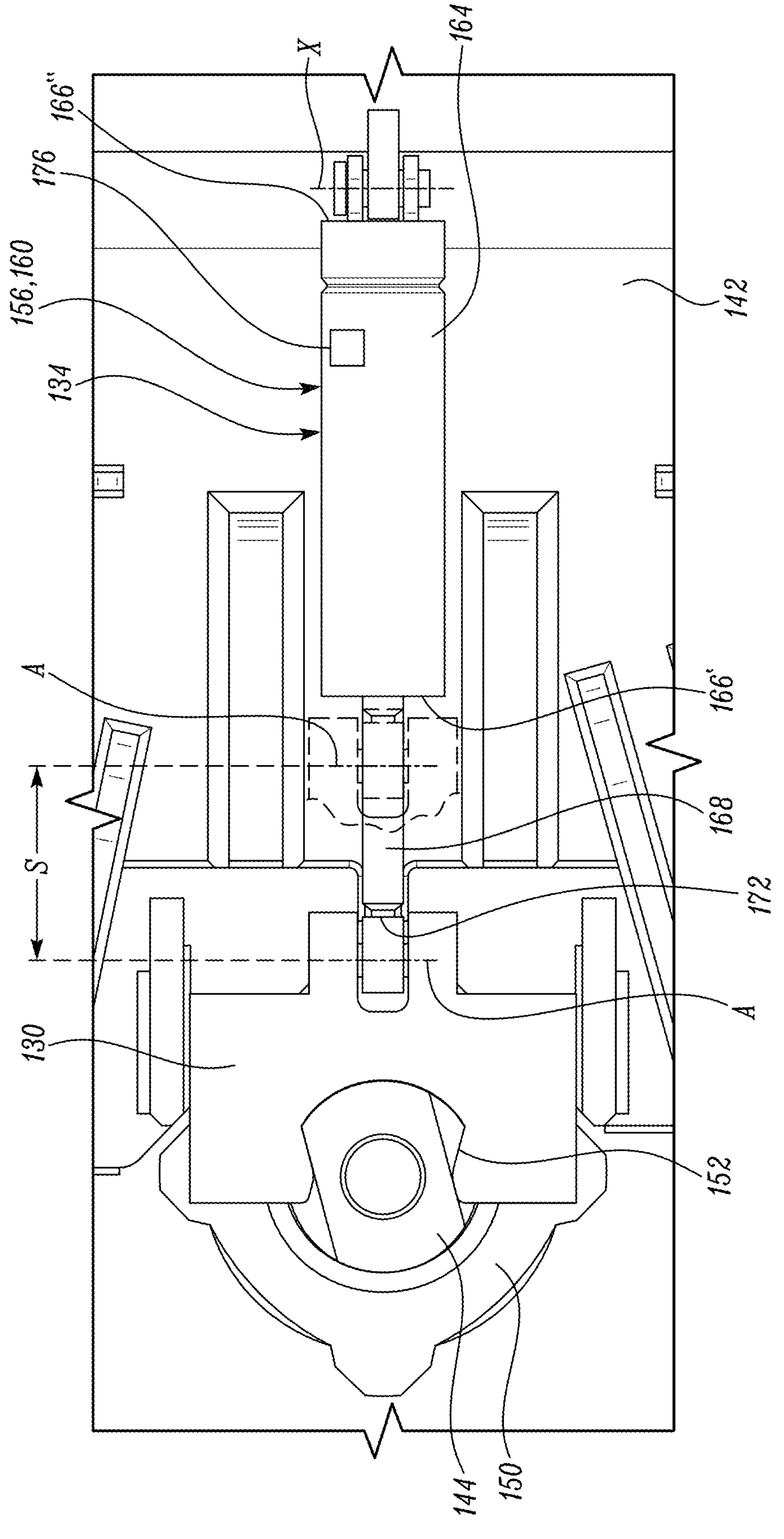
FIG. 4 is a top view of the deck having the new drill pipe with the actuator in an engaged position, according to an embodiment of the present disclosure.

The sensing device 176 is configured to detect a duty cycle of the actuator 156 (e.g., the fluid actuator 160). The duty cycle of the actuator 156 (or the fluid actuator 160) may be indicative of a stroke length 'S' (or a position) of the rod portion 168 relative to the cylinder 164 (or the sensing device 176). In an exemplary embodiment, as shown in FIG. 4, the stroke length 'S' may be defined as a distance between an initial position of the axis, A, (when the deck wrench 130 is at the disengaged/retracted position) and a final position of the Axis, A, (when the deck wrench 130 is at the engaged position). Further, it should be noted that, in one example, the duty cycle of the fluid actuator 160 may be computed in percentage and may be understood from the following example: at the 90% duty cycle of the fluid actuator 160, the rod portion 168 may be actuated to a position (or perform a stroke length) to position the deck wrench 130 to the engaged position (see FIG. 4), while at the 5% duty cycle of the fluid actuator 160, the rod portion 168 may be actuated to position the deck wrench 130 to the disengaged position (see FIG. 3).

In an example, to detect the duty cycle (e.g., stroke length, S) of the fluid actuator 160, the sensing device 176 may be adapted to detect a change in position of the deck wrench 130 (based on the change in the position of the axis, A). The sensing device 176 may be a proximity transducer (e.g., distance/position measuring sensor) that may detect a proximity (or distance) by which the position of the deck wrench 130 is changed (based on the change in the position of the axis, A), at any given point. Based on the distance, the position of the rod portion 168 with respect to the first end 166' may be computed, and thus an extent to which the rod portion 168 has moved, either to extend out or to retract in with respect to the cylinder 164, may be deduced, and, accordingly, the duty cycle of the fluid actuator 160 may be detected.

In some embodiments, the sensing device 176 may be a mass flow sensor that may determine the flow of fluid flowing into or out of the cylinder 164 to actuate the rod portion 168 of the actuator 156. The position of the rod portion 168 may be computed by detecting the mass flow of fluid (e.g., along with the direction of fluid flow), and thus the duty cycle of the fluid actuator 160 may be accordingly detected. The sensing device 176 may be disposed within the cylinder 164, although other sensor positions may be contemplated. For example, the sensing device 176 may be mounted to the outside of the cylinder 164 or at various other positions on the fluid actuator 160 to perform one or more of the aforementioned tasks.

The drill pipe 144 (or other drill string components 138 such as deck bushing 150) may wear over time and may cause misalignment between two adjacent drill pipes 144 (e.g., between the drill pipe 144 to be engaged/disengaged and the drill string 126) due to excessive wear of the drill pipe 144 to be engaged/disengaged to or from the drill string 126. The wear level of the drill string components 138 (e.g., the drill pipe 144), if not determined or measured from time to time, may lead to quality issues in the drilled holes, inefficient blasting, machine downtime, and/or accidents.

To determine health (or wear level) of the drill string components 138 (e.g., the drill pipe 144), in one or more aspects of the present disclosure, a system 170 is disclosed. The system 170 facilitates determination of the wear level of the drill string components 138, and provides alerts/warnings to operators associated with the drilling machine 100 from time to time, thereby ensuring safe and efficient operations of the drilling machine 100.

The system 170 includes a controller 174. The controller 174 may include a computing device having a single microprocessor or multiple microprocessors. For example, the controller 174 may include a memory, a secondary storage device, a clock, and a processing hardware, one or more of which may be used, in concert with another part of the controller 174, for accomplishing a task as discussed below in the present disclosure. The controller 174 may be configured to receive inputs (e.g., data related to the position of the rod portion 168 relative to the cylinder 164) from one or more components (e.g., the sensing device 176) of the drilling machine 100, process the input, and generate output signals based on the data inputs and/or the processed data.

The controller 174 is communicably coupled to the sensing device 176. By way of the controller's 174 communicable coupling with the sensing device 176, the controller 174 is configured to receive signals indicative of the duty cycle (e.g., the stroke length, S) of the actuator 156 (e.g., the fluid actuator 160) from the sensing device 176. For instance, the controller 174 receives a signal (out of signals) related to the duty cycle (or stroke length) of the actuator 156 corresponding to the engaged position of the deck wrench 130 (at which the deck wrench 130 is engaged with the drill string component 138).

Further, the controller 174 may process the signal related to the duty cycle of the actuator 156 corresponding to the engaged position of the deck wrench 130, and accordingly, determine a wear level of the drill string component 138. In an example, upon receiving a signal (from the sensing device 176) indicative of the 90% duty cycle of the actuator 156 when the deck wrench 130 is engaged with the drill string component 138 (at the engaged position), the controller 174 may determine that the drill string component 138 is new, devoid of wear and tear, and is safe to use, as shown in FIGS. 3 and 4.

The controller 174 may determine the wear level of the drill string component 138 to be equal to a first wear level upon receipt of the signal indicative of the duty cycle within a first range (prestored in a memory associated with the controller 174). For example, upon receiving a signal (from the sensing device 176) indicative of the duty cycle within an exemplary range of 91-95% duty cycle, the controller 174 may determine that the wear level of the drill string component 138 may correspond to 60-80% of a maximum allowable wear limit of the drill string component 138 (i.e., first wear level). The term "maximum allowable wear limit" may refer to a maximum amount of wear that is permissible for the safe and efficient functioning of the drill string component 138, and beyond which the drill string component 138 is to be replaced. Additionally, upon determining the wear level of the drill string component 138 to be equal to the first wear level, the controller 174 may be configured to output a first alert signal indicating a first level warning.

In an example, the controller 174 may display the first level warning to the operator via display units (e.g., located within the operator cabin 120 of the drilling machine 100 or a remote operating station). In another example, the controller 174 may output an audio warning signal corresponding to the first level warning. In some embodiments, the controller 174 may record the wear level of the drill string components 138 and store the wear level of the drill string component 138 for future analytical research to determine remaining life of the drill string components 138 or in some occasions to identify machine abuse by the operator, etc.

Further, the controller 174 may determine that the wear level of the drill string component 138 is equal to a second wear level upon receipt of the signal indicative of the duty cycle exceeding the first range. For example, upon receiving a signal (from the sensing device 176) indicative of the duty cycle exceeding the exemplary range of 91-95% duty cycle (e.g., shown via a stroke length S', in FIG. 6), the controller 174 may determine that the wear level of the drill string component 138 may correspond to 80-100% of the maximum allowable wear limit of the drill string component 138 (i.e., second wear level). Additionally, upon determining the wear level of the drill string component 138 to be equal to the second wear level, the controller 174 is configured to output a second alert signal indicating a second level warning. In an example, the controller 174 may display the second level warning to the operator via display units (e.g., located within the operator cabin 120 of the drilling machine 100). In another example, the controller 174 may output an audio warning signal corresponding to the second level warning.

Further, upon determining the wear level exceeding the first range in more than a threshold number of events, the controller 174, in some embodiments, may be configured to output a third alert signal indicating a third level warning. For example, upon receiving a signal (from the sensing device 176) indicative of the duty cycle exceeding the 95% duty cycle (e.g., shown via a stroke length S', in FIG. 6) for six successive events (i.e., more than the threshold number of events, say five events), the controller 174 may be configured to output the third level warning. Additionally, the controller 174, in other embodiments, may simultaneously output a control command, for example, to halt the operations of the drilling machine 100.

It should be noted that the values of the first range of duty cycle, as discussed in examples above, are exemplary and may vary depending on the types and configuration of the drilling machines and/or the drill string components 138. Further, although three warning levels are discussed above based on the wear levels of the drill string components 138, it may be contemplated that in other embodiments, the controller 174 may issue a higher or a lower number of warning levels based on a higher or a lower number of wear levels defined. It may be further contemplated that the threshold number of events, for example, to issue the third warning level, may vary depending on the type and configuration of the drilling machine 100 and/or the drill string components 138.

INDUSTRIAL APPLICABILITY

Figure 5:
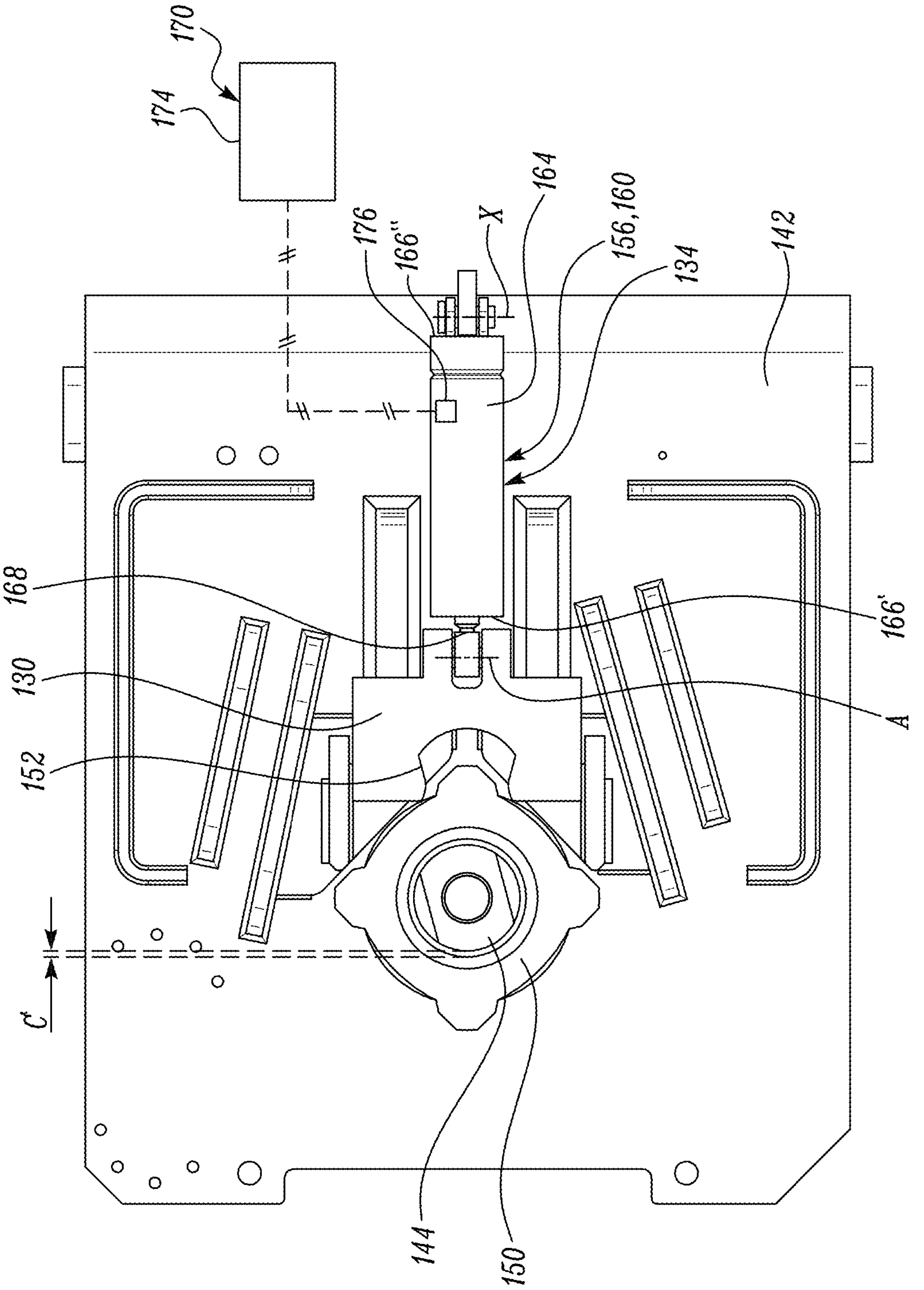
FIG. 5 is a top view of the deck having a worn-out drill pipe with the actuator in the default position, according to an embodiment of the present disclosure.
Figure 6:
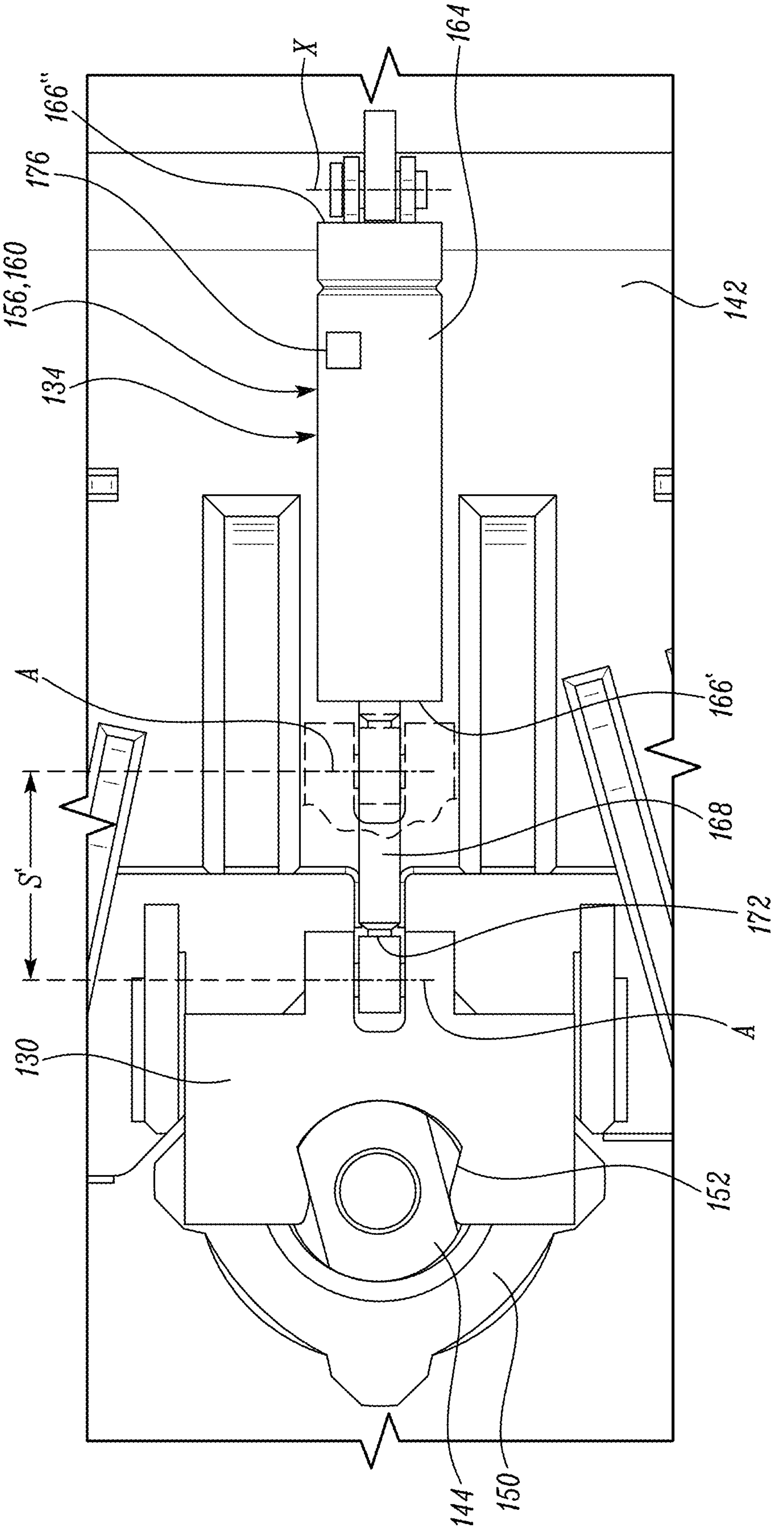
FIG. 6 is a top view of the deck having the worn-out drill pipe with the actuator in the engaged position, according to an embodiment of the present disclosure.

During the drilling operation, the fluid actuator 160 is at its default position (please see FIGS. 3 and 5). The default position may be defined as a fully retracted position (e.g., the disengaged position) of the rod portion 168 of the cylinder 164 of the deck wrench 130. Once the drilling operation is complete, and upon receipt of an input command to engage and/or disengage the drill string component 138 (e.g., the drill pipe 144) from the drill string 126, the rod portion 168 of the cylinder 164 may be extended to move the deck wrench 130 to its engaged position to engage and hold a portion of the drill string 126 (as shown in FIGS. 4 and 6).

In case of a new drill pipe 144, that is devoid of any wear and tear, a clearance, C, is defined between the drill pipe 144 and the deck bushing 150 (as shown in FIG. 3). The value of such clearance, C, may vary depending on the type and configuration of the drilling machine 100 and/or the drill string components 138. In an example, the clearance, C, may lie in an exemplary range of 3 mm to 4 mm. In another example, the clearance, C, may lie in an exemplary range of 5 mm to 8 mm. Over time, because these drill string components 138 are subjected to the undesired amount of side loads, abrasion due to dirt movement, and/or to the undesired amount of gravitational force, these drill string components 138 may be prone to premature wear. Due to this, the clearance, C, defined between the new drill pipe 144 and the deck bushing 150 may be increased to C', as the drill string components 138 (e.g., both the drill pipe 144 and the deck bushing 150) may wear over time (please see FIG. 5). In an example, the clearance, C', defined between the worn-out drill pipe 144 and the deck bushing 150 may now lie in a range of 19 mm to 20 mm. In another example, the clearance, C', may lie in an exemplary range of 21 mm to 23 mm.

Figure 7:
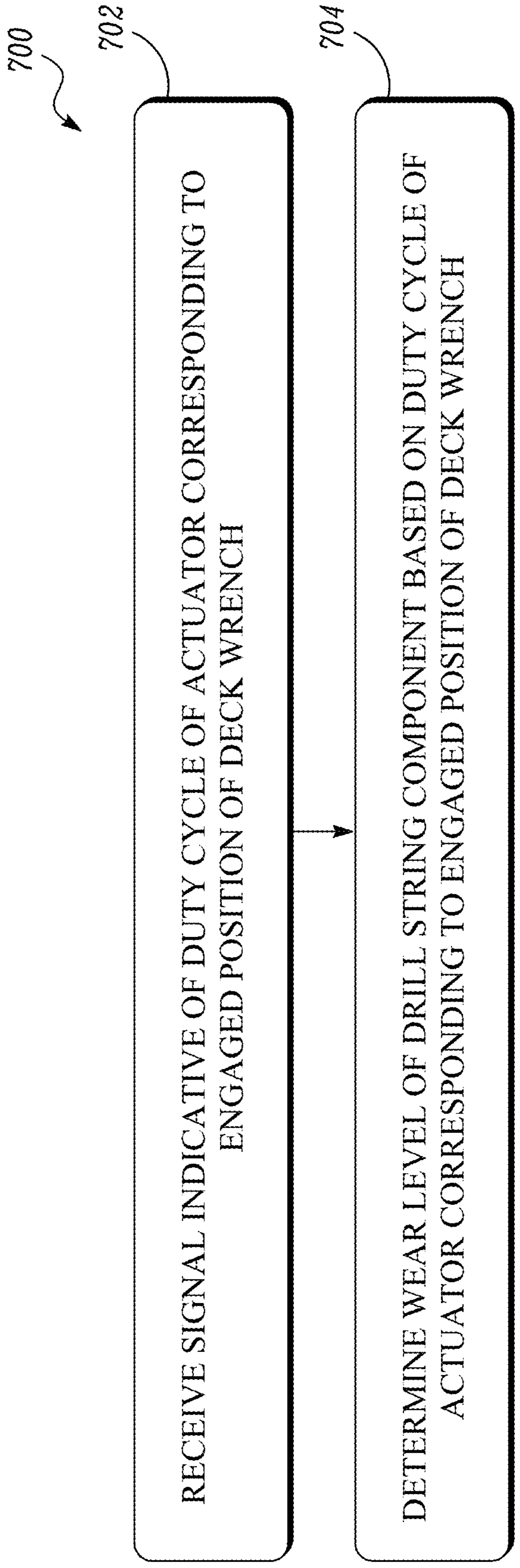
FIG. 7 is a flow chart depicting an exemplary method for determining health of the drill string component of the drilling machine of FIG. 1, according to an embodiment of the present disclosure.

Referring now to FIG. 7, an exemplary method for determining health (wear level) of the drill string component 138 of the drilling machine 100, is discussed. The method is discussed by way of a flowchart 700 that illustrates exemplary stages (e.g., 702 and 704) associated with the method. It will be appreciated that the order of steps described in the method is exemplary in nature and that the steps can be performed in a different order than what is set out below, as will be contemplated by a person skilled in the art based on the description of the present disclosure.

The method begins with receiving the signal indicative of the duty cycle of the actuator 156 (e.g., the fluid actuator 160) corresponding to the engaged position of a deck wrench 130, by the controller 174 at block 702. The controller 174 may receive the signal from the sensing means 176. At block 704, the method includes determining, by the controller 174, the wear level of the drill string component 138 based on the duty cycle of the actuator 156 corresponding to the engaged position of the deck wrench 130.

In an example, the controller 174 may determine the wear level of the drill string component 138 to be equal to the first wear level based on the receipt of the signal indicative of the duty cycle within the first range (prestored within the memory associated with the controller 174). Additionally, the controller 174 may output the first alert signal (e.g., audio and/or video signals) indicating the first level warning based on determining the wear level to be equal to the first wear level.

Further, the controller 174 may determine the wear level of the drill string component 138 to be equal to the second wear level based on receipt of the signal indicative of the duty cycle exceeding the first range. Additionally, the controller 174 may output the second alert signal (e.g., audio and/or video signals) indicating the second level warning based on determining the wear level to be equal to the second wear level.

Moreover, the method may include outputting the third alert signal indicating the third level warning, upon determining, by the controller 174, the wear level exceeding the first range in more than a threshold number of events. In an example, the method may include outputting the third level warning when the wear level exceeding the first range is determined more than five times. It may be contemplated that, in other embodiments, the threshold number of events may vary depending on the types and configuration of the machine 100 or the drill string component 138.

The system 170 is used to determine the health of the drill string component 138 (e.g., the drill pipe 144 or the deck bushing 150). For example, the system 170 helps in determining the wear level of the drill string component 138 and provides alerts/warnings to operators associated with the drilling machine 100 from time to time. The timely determination of the worn-out drill string components 138 helps in reducing misalignment of the drill string components 138 (e.g., drill pipe 144 and the remaining drill string 126). The timely determination of the worn-out drill string components 138 also reduces machine downtime (which may be caused due to usage of worn-out pipes 144), thereby ensuring safe and efficient operation of the drilling machine 100.

It will be apparent to those skilled in the art that various modifications and variations can be made to the method and/or system of the present disclosure without departing from the scope of the disclosure. Other embodiments will be apparent to those skilled in the art from consideration of the specification and practice of the method and/or system disclosed herein. It is intended that the specification and examples be considered as exemplary only, with a true scope of the disclosure being indicated by the following claims and their equivalent.

What is claimed is:

1. A system for determining health of a drill string component of a drilling machine, the system comprising:

a sensing device configured to measure a stroke length of a rod portion of an actuator, wherein the rod portion of the actuator is coupled to a deck wrench, the actuator configured to shift the rod portion and the deck wrench coupled thereto in a first linear direction to move the deck wrench toward the drill string component and a second linear direction opposite the first linear direction to move the rod portion and the deck wrench coupled thereto away from the drill string component; and a controller having a memory configured to store an initial stroke length representative of an initial clearance between the deck wrench and the drill string component when the drill string component is unworn;

the controller configured to:

receive, from the sensing device, the stroke length of the rod portion of the actuator that corresponds to linear movement of the rod portion in the first linear direction from a first position wherein the deck wrench is disengaged from the drill string component and permits rotational movement of the drill string component relative to the deck wrench to a second position wherein the deck wrench is engaged with the drill string component and restricts rotational movement of the drill string component relative to the deck wrench;

compare the stroke length of the rod portion moving linearly from the first position to the second position and the initial stroke length representative of the initial clearance between the deck wrench and the drill string component when the drill string component is unworn; and determine a wear level of the drill string component based on the comparison of the stroke length of the rod portion of the actuator as the rod portion is moved from the first position to the second position corresponding to the engagement of the deck wrench with the drill string component and the initial stroke length.

2. The system of claim 1, wherein the controller is configured to determine that the wear level of the drill string component is a first wear level based at least in part upon the stroke length of the rod portion of the actuator being within a first range.

3. The system of claim 2, wherein, upon determining the wear level of the drill string component is the first wear level, the controller is configured to output a first alert signal indicating a first level warning.

4. The system of claim 2, wherein the controller is configured to determine that the wear level of the drill string component is a second wear level based at least in part upon the stroke length of the rod portion of the actuator being within a second range greater than the first range, and wherein, upon determining the wear level of the drill string component is the second wear level, the controller is further configured to output a second alert signal indicating a second level warning.

5. The system of claim 4, wherein the controller is configured to output a third alert signal indicating a third level warning based at least in part upon the stroke length of the actuator exceeding the first wear level for a predetermined number of movements of the rod portion of the actuator between the first and second position.

6. The system of claim 1, wherein the actuator is a fluid actuator including a cylinder fixedly coupled to a mast frame, wherein the rod portion is displaceably positioned relative to the cylinder and defining a first end couplable to the deck wrench, and a second end opposite to the first end, and wherein the sensing device includes a proximity transducer disposed within the cylinder.

7. The system of claim 1, wherein the drill string component includes at least one of a drill pipe, a drill pipe adapter, and a drill bit.

8. A drilling machine, comprising:

a mast frame;

a drill string component configured to perform an operation of the drilling machine;

a deck wrench configured to move between a disengaged position to allow a rotational movement of the drill string component and an engaged position to restrict the rotational movement of the drill string component;

an actuator coupled to the mast frame, the actuator having a rod portion coupled to the deck wrench to move the deck wrench from the disengaged position to the engaged position, the rod portion having a first position wherein the rod portion positions the deck wrench in the disengaged position and a second position wherein the rod portion positions the deck wrench in the engaged position, the actuator configured to shift the rod portion and the deck wrench coupled thereto in a first linear direction to move the deck wrench toward the drill string component and a second linear direction opposite the first linear direction to move the rod portion and the deck wrench coupled thereto away from the drill string component, the rod portion having a stroke length that corresponds to linear movement of the rod portion in the first linear direction as the actuator shifts the rod portion from the first position to the second position;

a sensing device configured to measure the stroke length of the rod portion of the actuator; and a controller having a memory configured to store an initial stroke length representative of an initial clearance between the deck wrench and the drill string component when the drill string component is unworn;

the controller configured to:

receive, from the sensing device, the stroke length of the rod portion of the actuator that corresponds to linear movement of the rod portion from the first position to the second position;

compare the stroke length of the rod portion moving linearly from the first position to the second position and the initial stroke length representative of the initial clearance between the deck wrench and the drill string component when the drill string component is unworn; and determine a wear level of the drill string component based on the comparison of the stroke length of the rod portion of the actuator as the rod portion is moved from the first position to the second position corresponding to the engagement of the deck wrench with the drill string component and the initial stroke length.

9. The drilling machine of claim 8, the controller is configured to determine that the wear level of the drill string component is a first wear level based at least in part upon the stroke length of the rod portion of the actuator being within a first range.

10. The drilling machine of claim 9, wherein, upon determining the wear level of the drill string component is the first wear level, the controller is further configured to output a first alert signal indicating a first level warning.

11. The drilling machine of claim 9, wherein the controller is configured to determine that the wear level of the drill string component is a second wear level based at least in part upon the stroke length of the rod portion of the actuator being within a second range greater than the first range, and wherein, upon determining the wear level of the drill string component is the second wear level, the controller is configured to output a second alert signal indicating a second level warning.

12. The drilling machine of claim 11, wherein the controller is configured to output a third alert signal indicating a third level warning based at least in part upon the stroke length of the actuator exceeding the first wear level for a predetermined number of movements of the rod portion of the actuator between the first and second position.

13. The drilling machine of claim 8, wherein the actuator is a fluid actuator including a cylinder fixedly coupled to the mast frame, wherein the rod portion is displaceably positioned relative to the cylinder and defining a first end couplable to the deck wrench, and a second end opposite to the first end, and wherein the sensing device includes a proximity transducer disposed within the cylinder.

14. The drilling machine of claim 8, wherein the drill string component includes at least one of a drill pipe, a drill pipe adapter, and a drill bit.

15. A method for determining health of a drill string component of a drilling machine, the method comprising:

causing an actuator to move a rod portion through a stroke length in a linear direction from a first position to a second position, the rod portion coupled to a deck wrench to move the deck wrench upon movement of the rod portion;

measuring, via a sensing device, the stroke length of the rod portion of the actuator from the first position wherein the deck wrench is disengaged from a drill string component and permits rotational movement of the drill string component relative to the deck wrench to the second position wherein the deck wrench is engaged with the drill string component and restricts rotational movement of the drill string component relative to the deck wrench;

comparing the stroke length of the rod portion moving linearly from the first position to the second position and an initial stroke length representative of an initial clearance between the deck wrench and the drill string component when the drill string component is unworn; and determining, by a controller, a wear level of the drill string component based on the comparison of the stroke length of the rod portion of the actuator corresponding to the engagement of the deck wrench with the drill string component and the initial stroke length.

16. The method of claim 15 further including:

determining, by the controller, the wear level of the drill string component to be a first wear level based at least in part upon the stroke length of the rod portion of the actuator being within a first range.

17. The method of claim 16, further including:

outputting, by the controller, a first alert signal indicating a first level warning.

18. The method of claim 16, further including:

determining, by the controller, the wear level of the drill string component to be a second level based at least in part upon the stroke length of the rod portion of the actuator being within a second range greater than the first range; and outputting, by the controller, a second alert signal indicating a second level warning.

19. The method of claim 18, further including:

outputting, by the controller, a third alert signal indicating a third level warning based at least in part upon the stroke length of the actuator exceeding the first wear level for a predetermined number of movements of the rod portion of the actuator from the first to second position.

20. The method of claim 15, wherein the actuator is a fluid actuator including a cylinder fixedly coupled to a mast frame, wherein the rod portion is displaceably positioned relative to the cylinder and defining a first end couplable to the deck wrench, and a second end opposite to the first end, wherein the sensing device includes a proximity transducer disposed within the cylinder, and wherein the drill string component includes at least one of a drill pipe, a drill pipe adapter, and a drill bit.

* * * * *